United States Patent [19]

McClain

[11] Patent Number: 4,462,948
[45] Date of Patent: Jul. 31, 1984

[54] DISPERSION PROCESS FOR PREPARING THERMOPLASTIC RESIN FIBER

[75] Inventor: Dorothee M. McClain, Cincinnati, Ohio

[73] Assignee: National Distillers and Chemical Corporation, New York, N.Y.

[21] Appl. No.: 354,977

[22] Filed: Mar. 5, 1982

[51] Int. Cl.³ .............................................. C08F 6/14
[52] U.S. Cl. .................................... 264/140; 524/272; 524/394
[58] Field of Search ............. 525/352, 56; 162/157 R; 528/486, 501, 502, 503; 524/161, 272, 394, 396, 397, 423; 264/9, 12, 13, 14, 140

[56] References Cited

U.S. PATENT DOCUMENTS

| | | | |
|---|---|---|---|
| 3,422,049 | 1/1969 | McClain | 526/352 |
| 3,914,354 | 10/1975 | Uek et al. | 264/13 |
| 4,151,134 | 4/1979 | McClain | 524/161 |
| 4,151,135 | 4/1979 | McClain | 524/394 |
| 4,200,708 | 4/1980 | McClain | 524/394 |

Primary Examiner—Jay H. Woo
Attorney, Agent, or Firm—Kenneth D. Tremain

[57] ABSTRACT

A process is disclosed for obtaining olefin-polar comonomer resin in fibrous form. According to the invention, an olefin-polar comonomer resin such as an ethylene-vinyl acetate copolymer is vigorously agitated in molten form in water in the presence of a resin dispersion-forming amount of an alkali metal soap such as sodium stearate and a fiber-forming amount of base such as sodium hydroxide at a temperature below the degradation temperature of the resin to provide a dispersion of said resin in which a substantial number of the individual resin particles are in the form of a fiber possessing an average length of from about 50 to about 2500 microns and an average length to diameter ratio of at least about 3:1. Following cooling of the dispersion to below the solidification point of the resin, the resin fiber may be recovered employing known and conventional means, e.g., filtration, centrifugation, etc.

15 Claims, 6 Drawing Figures

FIG. I
PHOTOMICROGRAPHS OF PARTICLES
BELOW 53 μ of RUNS A - D.
(MAGNIFICATION X 100)
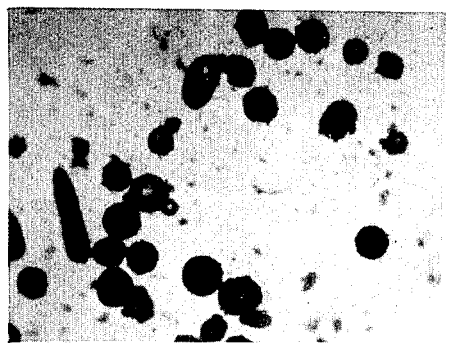
RUN A
RUN B
RUN C
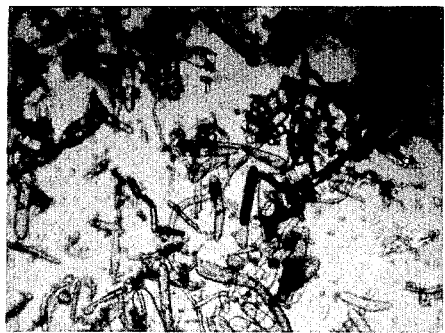
RUN D

FIG. 2
PHOTOMICROGRAPHS OF PARTICLES
BELOW 53μ of RUNS E and F.
(MAGNIFICATION X 100)
RUN E
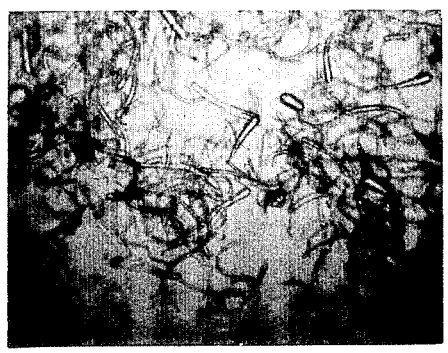
RUN F

DISPERSION PROCESS FOR PREPARING THERMOPLASTIC RESIN FIBER

BACKGROUND OF THE INVENTION

This invention concerns a process for preparing fibers of synthetic thermoplastic resin and, more particularly, to a process for preparing relatively short fibers of such thermoplastic resins as ethylene homopolymer, ethylene-vinyl acetate (EVA) copolymer and partially hydrolyzed ethylene-vinyl acetate (HEVA) terpolymer. Fibers resulting from the process of this invention have a variety of important industrial uses, e.g., as reinforcements for paper, non-woven fabrics and other web materials.

A number of processes are known for manufacturing fine powders of thermoplastic resin wherein the selected resin is dispersed in water containing a suitable resin dispersion-forming additive, e.g., a surface active agent or soap, at a temperature at or above the melting point of the polymer. Under the influence of vigorous agitation and aided by the dispersion-forming additive, the molten thermoplastic resin breaks up into minute particles of generally spheroidal shape, typically having an average particle diameter within the range of from about 20 to about 500 microns. Following cooling of the dispersion medium below the melting point of the resin the latter solidifies and is recovered as a fine powder, the individual particles for the most part preserving the spheroidal configuration which they possessed in the molten state. Processes of this type are described in, among others, U.S. Pat. Nos. 4,148,766; 4,148,768; 4,150,003; 4,151,003; 4,151,133 and 4,212,966. Of the foregoing, the processes of U.S. Pat. Nos. 4,150,003 and 4,151,133 employ an aqueous resin dispersion-forming medium containing an alkali metal soap of a higher carboxylic acid while the processes of U.S. Pat. Nos. 4,148,766 and 4,148,768, in addition to employing an alkali metal soap of a higher carboxylic acid, also employ a water-soluble salt to influence the particle size distribution of the displaced resin toward the lower end of the previously stated particle size range. U.S. Pat. No. 4,208,528 describes an aqueous resin dispersion-forming medium containing an alkali metal salt of an organophosphate ester and, optionally, a base such as sodium hydroxide to regulate particle size distribution. In all cases, the teachings of these prior art processes lead to the formation of resin particles of almost exclusively spheroidal configuration.

SUMMARY OF THE INVENTION

It has now been surprisingly discovered that a thermoplastic resin can be formed into fibers of relatively short length by the process which comprises vigorously agitating said resin in molten form in water in the presence of a resin dispersion-forming amount of an alkali metal soap and a fiber-forming amount of base at a temperature below the degradation temperature of the resin to provide a dispersion of said resin in which a substantial number of the individual resin particles are in the form of a fiber possessing an average length of from about 50 to about 2,500 microns and an average length to diameter ratio of at least about 3:1 and thereafter cooling said dispersion to below the solidification point of the resin.

BRIEF DESCRIPTION OF THE DRAWINGS

FIGS. A–F are photomicrographs (magnification ×100) of six distinct resin dispersions produced in accordance with Example I.

DESCRIPTION OF THE PREFERRED EMBODIMENTS

In general, the thermoplastic resins suitable for the practice of this invention include any normally solid synthetic organic polymeric thermoplastic resin whose decomposition point is somewhat higher than its melting point and somewhat less than the critical temperature of water. Included are polyolefins, vinyls, olefin-vinyl copolymers, olefin-allyl copolymers, polyamides, acrylics, polystyrenes, cellulosics, polyesters and fluorocarbons.

The polyolefins most suitable for the practice of this invention include normally solid polymers of olefins, particularly mono-alpha-olefins, which comprise from two to about six carbon atoms, e.g., polyethylene, polypropylene, polybutene, polyisobutylene, poly(4-methylpentene), and the like. Preferred polyolefin feeds are polyethylene and polypropylene.

Vinyl polymers suitable for use in this invention include polyvinyl chloride, polyvinyl fluoride, vinyl chloride/vinyl acetate copolymers, polyvinylidene chloride and fluoride.

Suitable olefin-vinyl copolymers include those of ethylene-vinyl acetate, ethylene-vinyl propionate, ethylene-vinyl isobutyrate, ethylene-vinyl alcohol, ethylene-vinyl acetate-vinyl alcohol, ethylene-vinyl acetate-sulfur dioxide, ethylene-vinyl acetate-carbon monoxide, ethylene-methyl acrylate, ethylene-ethyl acrylate, ethylene-ethyl methacrylate, ethylene-acrylic acid, ethylene-methacrylic acid and their salts and the like. Especially preferred are tacky ethylene-vinyl acetate copolymers and ethylene-vinyl acetate-vinyl alcohol terpolymers wherein the vinyl acetate constitutes at least about 15%, and preferably at least about 20%, of the resin by weight.

Olefin-allyl copolymers include ethylene-allyl alcohol, ethylene-allyl acetate, ethylene-allyl acetone, ethylene-allyl benzene, ethylene-allyl ether, ethylene-acrolein, and the like. Ethylene-allyl alcohol is especially preferred.

Preferred among the polyamides are linear super-polyamide resins commonly referred to as nylons. Such polymers can be made by the intermolecular condensation of linear diamines containing from 6 to 10 carbon atoms with linear dicarboxylic acids containing from 2 to 10 carbon atoms. Equally well, the superpolyamides may be made from amine-forming derivatives of these monomers such as esters, acid chlorides, amine salts, etc. Also suitable are super-polyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide, and polycaprolactam. Especially preferred are nylons having intrinsic viscosities ranging between 0.3 and 3.5 dl/g. determined in m-cresol.

The resin dispersion-forming system is a soap in the presence of a fiber-forming amount of a base such as sodium hydroxide. The soap employed can be preformed soap or, alternatively, soap produced in situ.

Each of the components may be introduced independently and separately but it is also possible to combine two or more of the components before introduction into the dispersion vessel. For example, the fiber-forming base and the preformed soap, when used, are conveniently added in solution in part of the water used to produce the dispersion. Where in situ soaps are employed, the base introduced to neutralize free fatty acid can also be added in aqueous solution, preferably in excess of the amount needed to provide the soap so that unreacted base will be present in an amount sufficient to satisfy the requirement for the fiber-forming component of the dispersion medium. The thermoplastic resin itself can also be employed as a medium for introducing the other components. Thus, for example where an in situ soap is desired, it may be convenient to blend free fatty acid into the resin before introduction into the dispersion, and, where a preformed soap is employed, this, too, can be blended into the resin prior to dispersion. Less commonly, the base is blended into the resin before dispersion, either alone or in combination with free fatty acid, for making in situ soap. The practice of blending into the polymer higher carboxylic acid for in situ soap and base to make the in situ soap before dispersion is ordinarily not preferred.

As an alternative to the foregoing in situ soap formation, the soap can be formed from a glyceride or other ester by saponification with more than the stoichiometrically required amount of base as in the previous case. The triglyceride or other acid ester can be added directly to the dispersion vessel or previously blended into the resin with base but this, too, is ordinarily not preferred.

The various embodiments of the invention can also be carried out as a continuous operation, for example, in the manner described in U.S. Pat. No. 3,432,483, the entire contents of which are incorporated by reference herein. In such continuous operation, the polymer to be formed into fiber in accordance with the present invention is fed to the bottom of the dispersion vessel and the dispersion is removed at the top of the dispersion vessel. Separate lines supplying the various components of the dispersion enter the bottom of the vessel itself which can be provided with a pre-mixing zone. The components can be introduced separately or in combination as hereinbefore described.

In general the properties of the type of resins dispersed are not significantly affected by the particle-forming process although some small degree of saponification may occur.

Although it is more advantageous to employ the process to disperse high molecular weight resins, that is to say, resins having a number average molecular weight of about 10,000 and above, this should not be understood as limiting the process to such resins since it is also within the scope of the invention to disperse resins having a number average molecular weight below about 10,000, even as low as about 1000–1500. Mixtures of thermoplastic resin can be dispersed employing the process of this invention.

The type of resin that is dispersible by the process of the invention is not limited in any way as to method of synthesis. In general, however, the resins selected will most often be made by free radical addition polymerization processes used commercially to manufacture low density polyethylene. Certain other dispersible resins are made by Ziegler-Natta and Phillips polymerization processes, and even by low temperature cationic polymerization.

Specific examples of resins which can be used herein are poly(ethylene-co-vinyl acetate) containing from about 15 to about 85 weight percent vinyl acetate, preferably about from 20 to about 70 weight percent vinyl acetate; poly(ethylene-co-methyl acrylate) and poly(ethylene-co-ethyle acrylate) containing from about 15 to about 85 weight percent of the acrylate ester; poly (stryene-co-acrylonitrile) with from about 15 to about 85 weight percent acrylonitrile; poly(ethylene-co-vinyl acetate co-vinyl alcohol) containing from about 15 to about 85 weight percent of combined vinyl acetate and vinyl alcohol, poly(ethylene-co-vinyl acetate-co-sulfur dioxide or co-carbon monoxide) with from about 15 to about 85 weight percent of total monomer units other than ethylene, and poly (ethylene-co-vinyl alcohol-co-sulfur dioxide or co-carbon monoxide) also containing from about 15 to about 85 weight percent of monomer units other than ethylene.

The preferred soaps are soaps of alkali metals of atomic weight of at least 23, i.e. sodium, potassium, rubidium and cesium, and, of these, the more preferred are sodium and potassium because of the availability or ease of preparation, the most preferred being sodium which is most economical and practical.

The soaps for use in the present invention are known compounds, i.e., salts of higher carboxylic acids with the alkali metals. The acid moiety of the soap can be saturated or unsaturated, most commonly ethylenically-unsaturated, linear or branched and can be composed of a mixture of such acids, for example as is obtained by saponification of natural glyceride fats. Included in the term "higher carboxylic acid" as used in this invention are the so-called dimer acids made by dimerization of polyunsaturated linear fatty acids. The soap should not react adversely to any appreciable extent with the resin substrate, i.e., it should be substantially inert to the resin. As employed herein, and in the appended claims, the term "soap" embraces the aforesaid salts of higher carboxylic acids, particularly the well-known fatty acids.

The preferred acid is a straight-chain $C_8$–$C_{22}$ monocarboxylic acid, which may be saturated or may contain one or more carbon-carbon double bonds per molecule, and may contain even or odd number of carbon atoms. Examples are caprylic acid, pelargonic acid, caprioc acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, linoleic acid and linolenic acid as well as mixtures of such acids and dimer acids made by dimerization of polyunsaturated fatty acids, e.g. linolenic acid. Dimeric acids are commercially available and contain 75–95% dimer, 4–25% trimer, and from a trace to 3% of monomeric polyunsaturated fatty acid.

Where a preformed soap is introduced, it will be a soap prepared by neutralization of one of the above disclosed acids or mixtures, with one or mixtures of the bases disclosed below or alternatively, commercially available fatty acid salts can be used.

As previously stated, a fiber-forming amount of base must be present in the dispersion medium to provide the dispersed resin in fiber form. The term "base" as employed herein refers to alkali metal hydroxides, e.g., sodium hydroxide and potassium hydroxide, and salts of alkali metals which in a 1.0 molar solution, exhibit a pH of about 11.0 or higher, e.g., sodium phosphate and sodium carbonate. Sodium hydroxide is especially preferred. The fiber-forming amount of base to be employed for a given resin can be readily determined by simple and routine experimentation. The amount, of course, will vary with different resins and dispersing agents. Generally, the amount of base included in the process will vary from about 0.5 to about 10 weight parts per 100 weight parts of resin and preferably from about 0.8 to about 5 weight parts per 100 weight parts of resin.

Fiber formation can be further favorably influenced by the presence of a water-soluble salt in the dispersion medium. Such water soluble salt is a substantially neutral salt. For the purposes of this invention, such a salt is defined as one that at a concentration of 1 molar in pure water at 20° C. produces a solution whose pH lies between 4 and 9. The cation of the salt is derived from an alkali metal or any other metal that does not form insoluble soaps with the above-disclosed fatty acid selected at the operating temperature of the process, i.e., is inert to the soap employed. The cation can be monovalent, divalent or of higher valence. The nature of the anion of the salt does not appear to be critical; the anion can be, for example, fluoride, chloride, bromide, iodide, bisulfate, sulfate, hydrogen phosphate, dihydrogen phosphate, nitrate, bicarbonate, acetate or propionate anion, or similar such anions. Mixtures of salts can be employed. Specific examples of the optional water-soluble, substantially neutral salts are lithium floride, lithium chloride, sodium chloride, sodium bisulfate, sodium sulfate, sodiumhydrogen phosphate, ammonium chloride, potassium dihydrogen phosphate, sodium acetate, sodium propionate, etc. The cation of the soap and the water-soluble salt can be the same or different. When used herein, the salt can be present at a level or from about 0.5 to about 20 weight parts per 100 weight parts of resin.

It is usually preferred that the ratio of resin to water range from about 0.1 to about 3 parts of resin per part of water on a weight basis. Lower ratios are operable, but uneconomical, whereas higher ratios, though usable, present operational difficulties. The most preferred range is about 0.25 to about 0.65 parts of resin per part of water on a weight basis. The weight ratio of higher carboxylic acid soap to resin can vary from about 0.01 to about 0.30, the preferred rato being from about 0.03 to about 0.12. The use of lower ratios of soap does not always result in the desired dispersion of the resin. Higher ratios are generally unnecessary and therefore uneconomical. The preferred higher carboxylic acid is a fatty acid, the most preferred fatty acid being stearic acid, and the preferred fatty acid soap is sodium stearate.

The dispersion temperature can range from about 100° C. to about 300° C., but temperatures of from about 150° C. to about 270° C. are preferred. Dispersions are usually not readily obtainable at lower temperatures and higher temperatures are usually not required for successful dispersion. The pressure is autogenous. The rate of stirring should vary from about 1,800 to about 4,000 rpm with from about 2,200 to about 3,800 rpm being preferred, although stirring rates that are lower are at times sufficient. Higher stirring rates can be employed but usually are not advantageous. The dispersion times range from about 1 minute to about 1 hour; times of about 5 to about 15 minutes are preferred.

The dispersions of resin substrate produced in accordance with the present invention are generally composed of fibrous particles of from about 50 to about 2,500 microns average length, the majority of the fibers being from about 100 to about 2,000 microns in length. The length to diameter ratio of the fibers is on the order of from about 3:1 or more and can be as high as 20:1 or more. In general, it is preferred to operate the process under conditions which will provide at least about 50% of the particles in the minimum, but preferably greater, length to diameter ratio. Most preferably, at least 80% of the particles will possess a length to diameter ratio of at about 5:1, and better yet, at least 8:1. As should be expected, the efficiency of the present dispersion process and the average size and length to diameter ratio of the dispersed product will vary to a certain extent with the selected soap and optional salt, the temperature, the amounts of reagents employed and other factors with which those skilled in the art are familiar.

EXAMPLE

The following runs, A to F inclusive, were carried out upon UE-634, an ethylene-vinyl acetate copolymer available from U.S. Industrial Chemicals Co. division of National Distillers and Chemical Corporation having a melt flow rate (M.F.R.) of 0.58 g/10 min. and a nominal interpolymerized vinyl acetate content of about 28%. In each run, 164 gm of UE-634 gm resin incorporated with stearic acid were added to 450 ml distilled, deionized water together with the amounts of sodium hydroxide and sodium chloride indicated in the accompanying table. Under rapid mechanical stirring, the mixture was heated to 204° C. and maintained at this temperature for a brief period after which the medium was cooled. The resin dispersion resulting from each run was examined under a microscope at 100×power. Photomicrographs of the dispersions are reproduced in the attachments hereto. The photomicrographs clearly show the influence of increasing the quantity of sodium hydroxide and the optional presence of salt on the shape of the particles. It appears that the number of particles exhibiting a fibrous appearance as well as the average length to diameter of the particles increases with the concentration of hydroxide, other factors remaining substantially the same. It further appears that the quantity of base required to achieve a given degree of fiber formation can be decreased by the addition of a salt to the dispersion medium.

TABLE

PARTICLE SIZE DISTRIBUTION OF UE-634 DISPERSIONS MADE WITH ADDED AMOUNTS OF NaOH AND NaCl

| | | Dispersion | | Product | | | | |
|---|---|---|---|---|---|---|---|---|
| | | Percent NaOH Excess above | NaCl based on polymer | Weight Percent of Particles Having a Diameter in Microns of | | | | |
| Run | Resin | requirements | p.p.h. | <106 | 106–149 | 149–250 | 250–420 | >420 |
| A | UE-634 incorporated with St. Acid* | 10.0 | — | 42.9 | 21.5 | 21.0 | 9.4 | 5.1 |

TABLE-continued

PARTICLE SIZE DISTRIBUTION OF UE-634 DISPERSIONS MADE WITH ADDED AMOUNTS OF NaOH AND NaCl

| | Dispersion | | | Product | | | | |
|---|---|---|---|---|---|---|---|---|
| | | Percent NaOH Excess above | NaCl based on polymer | Weight Percent of Particles Having a Diameter in Microns of | | | | |
| Run | Resin | requirements | p.p.h. | <106 | 106–149 | 149–250 | 250–420 | >420 |
| B | UE-634 incorporated with St. Acid* | 22.4 | — | 47.8 | 24.2 | 16.2 | 6.2 | 5.5 |
| C | UE-634 incorporated with St. Acid* | 34.7 | — | 54.2 | 19.5 | 11.0 | 10.4 | 4.9 |
| D | UE-634 incorporated with St. Acid* | 46.9 | — | 65.8 | 13.3 | 8.7 | 9.6 | 2.5 |
| E | UE-634 incorporated with St. Acid* | 10.0 | 5 | 28.7 | 15.9 | 13.7 | 23.1 | 18.4 |
| F | UE-634 incorporated with St. Acid* | 10.0 | 10 | 56.5 | 9.3 | 8.6 | 8.3 | 17.2 |

*All polymers contained enough stearic acid to make 10 p.p.h. sodium stearate in situ. All charges contained stoichiometic plus excess amounts of sodium hydroxide as indicated in the table. Dispersion temperature was 200° C. approximate solid content 25%.

What is claimed is:

1. A process for obtaining olefin-polar comonomer resin in fibrous form which comprises vigorously agitating an olefin-polar-comonomer resin in molten form in water in the presence of a resin dispersion-forming amount of an alkali metal soap and a fiber-forming amount of base of from about 0.5 to about 10 parts by weight per 100 parts by weight of resin at a temperature below the degradation temperature of resin to provide a dispersion of said resin in which a substantial number of the individual resin particles are in the form of a fiber possessing an average length of from about 50 to about 2500 microns and an average length to diameter ratio of at least about 3:1 and thereafter cooling said dispersion to below the solidification point of the resin.

2. The proess of claim 1 wherein the olefin-polar comonomer resin is as ethylene-vinyl acetate copolymer containing from about 15 to about 85 weight percent inter-polymerized vinyl acetate.

3. The process of claim 1 wherein the olefin-polar comonomer resin is an ethylene-vinyl acetate copolymer containing from about 20 to about 70 weight perent inter-polymerized vinyl acetate.

4. The process of claim 1 wherein the alkali metal soap is sodium stearate.

5. The process of claim 1 wherein the base is sodium hydroxide.

6. The process of claim 1 wherein a water-soluble salt is additionally present to positively influence fiber formation.

7. The process of claim 6 wherein the salt is sodium chloride.

8. The process of claim 1 wherein from about 0.8 to about 5 weight parts of base per 100 weight parts of resin are employed.

9. The process of claim 6 wherein from about 0.5 to about 20 weight parts of salt per 100 weight parts of resin are employed.

10. The process of claim 6 wherein from 2 to about 15 weight parts of salt per 100 weight parts of resin are employed.

11. The process of claim 1 wherein at least 50% of the resin particles resulting from the process possess an average length to diameter ratio of at least about 3:1.

12. The process of claim 1 wherein at least about 80% of the resin particles resulting from the process possess an average length to diameter ratio of at least about 5:1.

13. The process of claim 1 wherein the fiber particles are recovered from the dispersion medium.

14. The process of claim 1 wherein the ratio of resin to water ranges from about 0.1 to about 3 parts of resin per part of water on a weight basis.

15. The process of claim 1 wherein the dispersion temperature ranges from about 100° C. to about 300° C. and the pressure is autogeneous.

* * * * *